UNITED STATES PATENT OFFICE.

JOSEPH WILLIAM POULTON, OF WESTMOUNT, QUEBEC, CANADA.

POLISHING-POWDER.

1,145,920.  Specification of Letters Patent.  Patented July 13, 1915.

No Drawing.  Application filed December 10, 1914. Serial No. 876,481.

*To all whom it may concern:*

Be it known that I, JOSEPH WILLIAM POULTON, a subject of the King of Great Britain, residing at No. 1170 Greene avenue, Westmount, Province of Quebec, Canada, have invented certain new and useful Improvements in Polishing-Powder; and I do hereby declare that the following is a full, clear, and exact description of the invention, such as will enable others skilled in the art to which it appertains to make and use the same.

The invention to be hereinafter described relates to polishing powders.

The main objects of the invention are, to produce an easily prepared powder for cleaning and polishing gold and silver ware, which can be made in large quantities at small cost, is free from all fats, greases, or acids, and will produce a rich dark gloss upon the silver treated.

Further objects are, to produce a powder which can be quickly and easily applied, and is easily removed, can be washed or wiped off, and which is non-poisonous and absolutely non-injurious to the article treated.

In preparing my powder I use the best grade of precipitate calcium carbonate (white precipitated chalk), carbonate of lime (powdered chalk), and jewelers' rouge. The rouge is prepared by calcination from ferrous sulfate, which produces an iron oxid in the form of a very fine and velvety reddish-brown powder. This rouge, prepared as indicated, contains no fats or acids and is therefore suitable for the purpose for which it is to be used.

The ingredients given above, and prepared as stated, are placed together in a mill, in the proportions of about 28 parts of white precipitated chalk, 4 parts of powdered chalk, and 1 part of jewelers' rouge, by weight, and are thoroughly milled and ground together. The resulting product is a very fine and velvety powder of a light pinkish hue. This powder is placed in suitable containers and is ready for use.

In using the powder, a sufficient quantity is placed in a saucer, or the like, and mixed with water to form a creamy paste. This paste is spread on the article to be cleaned or polished, by means of a sponge, soft cloth, or other suitable instrument, and allowed to dry, which takes place very quickly. When dry, the powder is removed by rubbing with a chamois, a piece of soft cloth, or a soft plate brush; or it may be removed by washing the article in clear warm water. The result is a rich deep gloss closely resembling the gloss of old Sheffield plate and completely free from that clouding or staining which is caused by powders containing fats or acids.

In case the article to be cleaned is very badly stained or soiled, the powder is mixed with methylated spirits, instead of water. When mixed in this manner, and applied with a soft cloth, the powder quickly removes the worst stains and produces a high polish.

The unprecipitated chalk is added to the mixture because it has a rather soft pasty quality which greatly diminishes the rasping quality of the precipitated chalk, the individual granules of which seem to be more definitely separated by precipitation. The advantage of this is that the hands of the person using the powder are not so roughened as when the precipitated chalk alone is used. Of course, if desired, the unprecipitated chalk may be omitted or replaced by precipitated chalk.

Having thus fully described my invention, what I claim as new and desire to secure by Letters Patent is:

1. A polishing powder containing precipitated chalk, iron oxid, and unprecipitated chalk.

2. A polishing powder containing precipitated chalk, unprecipitated chalk, and iron oxid, in the proportions of about 28 parts of the first, 4 parts of the second, and 1 part of the third.

In witness whereof I have hereunto set my hand in the presence of two witnesses.

JOSEPH WILLIAM POULTON.

Witnesses:
A. PIZZOROLO,
A. BASTIEN.